United States Patent [19]

Huisken

[11] Patent Number: 5,524,027
[45] Date of Patent: Jun. 4, 1996

[54] DATA RECEIVER, METHOD OF CALCULATING METRICS, AND SIGNAL PROCESSING DEVICE

[75] Inventor: Josephus A. Huisken, Eindhoven, Netherlands

[73] Assignee: U. S. Philips Corporation, New York, N.Y.

[21] Appl. No.: 422,380

[22] Filed: Apr. 14, 1995

[30] Foreign Application Priority Data

Apr. 22, 1994 [EP] European Pat. Off. ............ 94201114.9

[51] Int. Cl.$^6$ ..................................................... H03D 1/00
[52] U.S. Cl. ............................ 375/341; 374/245; 371/43
[58] Field of Search ................................. 375/341, 245, 375/342; 371/43

[56] References Cited

U.S. PATENT DOCUMENTS 5,204,874  4/1993  Falconer et al. ........................... 375/1

OTHER PUBLICATIONS

Huisken et al., "Specification, Partitioning and Design of a DAB channel decoder", IEEE Special Publications, Oct. 1993, pp. 21–29.

*Primary Examiner*—Stephen Chin
*Assistant Examiner*—T. Ghebretinsae
*Attorney, Agent, or Firm*—Brian J. Wieghaus

[57] ABSTRACT

A hardware-efficient data receiver in which the receiver digital baseband signal samples relate to the bits in the transmission signal. For each sample, a metric calculator calculates an input data element (metric) for the soft decision decoder in the receiver. The metric is a binary word of whose most significant bit (gross bit) indicates the most likely value ('0' or '1') of a bit in the transmission signal. The other bits of the metric (reliability bits) express the reliability of this gross bit. The metric calculator has a monotonous transition function with equidistant steps between two extreme metric values (all metric bits are '0' or '1'). According to this transition function, the metric value varies as a function of the digital baseband signal sample value in a range bounded by two saturation values. The number of different sample values in this range, including the saturation values, is two to the power of an integer. Within this range, the reliability bits may readily be derived from a selected number of bits in the binary representation of a digital baseband sample.

10 Claims, 1 Drawing Sheet

DATA RECEIVER, METHOD OF CALCULATING METRICS, AND SIGNAL PROCESSING DEVICE

BACKGROUND OF THE INVENTION

The invention relates to a data receiver comprising:

an input part for converting a transmission signal into a digital baseband signal having samples relating to a distinct bit in said transmission signal;

a metric calculator for calculating, from each of the digital baseband signal samples, a metric comprising a gross bit representing the value of said distinct bit and at least one reliability bit for indicating the reliability of said gross bit;

a soft-decision decoder for deriving data from metrics supplied thereto.

The invention also relates to a method of calculating metrics from a digital baseband signal in a data receiver and to a signal-processing device for performing said method.

Such a receiver is known from 'Specification, Partitioning and Design of a DAB Channel Decoder' by J. A. Huisken et al., VLSI Signal Processing, volume VI, pages 21 to 29, IEEE Special Publications October 1993, in which a receiver for Digital Audio Broadcasting (DAB) is described. The known receiver successively comprises a front-end, a quadrature demodulator, a channel decoder and an audio decoder, which is shown in the block diagram of FIG. 1 of the cited document. The front-end and quadrature demodulator retrieve and subsequently digitize the complex modulation signal from an analog RF DAB-signal at the receiver input. The digitized complex modulation signal, having real and imaginary signal components, is supplied to the channel decoder. From this signal, the channel decoder retrieves data which is fed to an audio decoder.

The channel decoder performs signal processing inverse to that of the channel encoder at the transmitter end. Channel encoding and decoding at the transmitter and receiver end respectively, like in DAB, is used to enhance the robustness of the transmission. Transmission channel deficiencies may affect the transmission signal in the sense that bit errors are introduced. The channel decoder in the known receiver comprises a Viterbi decoder for correcting bit errors by using redundancy in the DAB transmission signal. At the transmitter end this redundancy has been added by Viterbi encoding of the data to be transmitted.

The Viterbi decoder in the known receiver is of the soft-decision type, well known to those skilled in the art. Generally stated, a soft-decision decoder may retrieve transmitted data at a lower bit-error rate (BER) than a hard-decision decoder under similar reception conditions. This is because a soft-decision decoder can use redundancy in a transmission signal more effectively than a hard decision decoder. As it were, a soft-decision decoder concentrates its error-correcting capabilities on those bits which are most likely erroneous. Consequently, the soft-decision decoder requires input data also comprising bit reliability indicators so as, to distinguish the more and the less "certain" bits.

In the known receiver, the data elements input to the soft-decision decoder are referred to as metrics. A metric comprises a gross bit and three reliability bits. The gross bit indicates the most likely value of a bit in the transmission signal to which the metric relates. The reliability bits indicate the error probability of this gross bit. It is to be noted that a number of three reliability bits is a mere design choice. It would equally have been possible to use a different number of reliability bits in a metric.

In the known DAB receiver, the metrics are calculated in the demodulation processor from a digital baseband signal having samples which relate to bits in the transmission signal. Said digital baseband signal is obtained by further processing of the digitized complex modulation signal supplied by the quadrature demodulator. It comprises Fast Fourier Transform (FFT) add differential phase calculations on successive groups of digitized complex modulation signal samples. This further processing is inverse to the processing at the transmitter end relating to the modulation technique as used in DAB: Orthogonal Frequency Division Multiplex (OFDM). With this modulation technique, the bits in the transmission signal are represented as phase differences in a frequency multiplex of carriers.

It has been proposed to jointly perform said further processing and metric calculations by means of a commercially available digital signal processing device, for example the TMS 320. The versatility of these types of devices renders them very well suitable for use in experimental receivers, the signal-processing characteristics being readily adjustable by reprogramming software stored in a memory within the device or coupled thereto. However, the use of these devices in mass-produced consumer products is generally not very cost-effective. It has therefore been proposed to develop a demodulator processor in dedicated hardware.

SUMMARY OF THE INVENTION

Consequently, it is, inter alia, an object of the invention to provide a metric calculator for a receiver as decribed in the opening paragraph, having relatively few components when realised in dedicated hardware.

According to the invention, such a receiver is characterized in that the metric calculator comprises means for setting a metric:

to a first extreme value (for example, all metric bits are '0' or '1'), in response to a digital baseband signal sample whose value is smaller than a first saturation value;

to a second extreme value (for example, all metric bits are '1' or '0'), in response to a digital baseband signal sample whose value is larger than a second saturation value; and to a value according to a monotonous transition function between the extreme values, in response to a digital baseband signal whose value is in a range bounded by the first and the second saturation value, said range comprising a number of $2^k$ different digital baseband signal sample values including the boundary saturation values, k being an integer larger than the number of reliability bits (r) but smaller than or equal to the number of bits (n) in the binary representation of the digital baseband signal.

Digital signal rumples are generally represented as binary words having n bits b(0) ... b(n), in an order of increasing significance. The metrics are in effect binary words having r bits m(0) ... m(r) in an order of increasing significance, and in which bit m(r) is the gross and bits m(0) ... m(r–1) are the reliability bits. In the invention, not all bits b(0) ... b(n) of the digital baseband signal, samples are needed to calculate the reliability bits m(0) ... m(r–1), the same applying to the calculation of the gross bit. Because the number of different digital baseband sample values in the range between the first and the second saturation value is $2^k$, the reliability bits of the metric may be calculated from bits b(k–2) to b(k–r–1) of the digital baseband signal. The gross bit may readily be derived from at least one of the more significant bits b(k−1) to b(n). Since the metric calculation is performed on a limited number of bits, the hardware required to perform this calculation is relatively simple.

Advantageously, the receiver according to the invention is characterized in that the input part comprises means for matching a first and a second nominal sample value of the digital baseband signal, relating to a first and a second value of the bits in the transmission signal respectively, with said first and second saturation values of the metric calculator respectively. This enables an optimization of the receiver sensitivity, given the characteristics of the metric calculator.

A preferred embodiment of the receiver is characterized in that the binary value of a sample of the digital baseband signal is represented in two's complement, in that the first saturation value equals $-2^{k-1}$ and in that the second saturation value equals $+2^{k-1}-1$. This allows a very hardware-efficient realization of a metric calculator while said range relating to the transition function of the metric calculator is symmetrically located within the dynamic range of the digital baseband signal.

A further preferred embodiment is characterized in that k is larger than r+1. This is to prevent computation noise, resulting from digital signal processing prior to the metric calculation, from affecting the metrics.

Yet a further preferred embodiment is characterized in that k is smaller than n. This is to reserve headroom in the A/D conversion, so as to prevent distortion of the digital baseband signal due to momentary amplitude fluctuations in the transmission signal.

It is a further object of the invention to provide a method of calculating metrics from a digital baseband signal. Another object of the invention is to provide a signal-processing device comprising a metric calculator for performing said method.

BRIEF DESCRIPTION OF THE DRAWINGS

The invention will be described in more detail and by way of example with reference to the accompanying drawing, in which.

DESCRIPTION OF THE PREFERRED EMBODIMENTS

Figure 1:
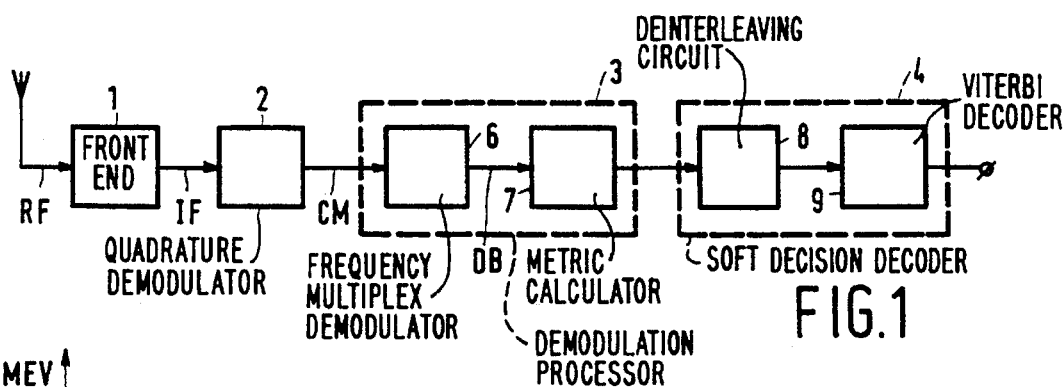
FIG. 1 represents a receiver according to the invention.

The receiver shown in FIG. 1 is similar to that of FIG. 1 in the cited document. The receiver shown in FIG. 1 represents a DAB receiver, successively comprising a front-end 1, a quadrature demodulator 2, a demodulation processor 3 and a soft-decision decoder 4. The demodulation processor comprises a frequency multiplex demodulator 6 and the metric calculator 7. The soft-decision decoder 4 comprises a de-interleaving circuit 8 having a DRAM, and a Viterbi-decoder 9 of the soft-decision type. Compared to FIG. 1 in the cited document, the audio decoder has been omitted. It is irrelevant to the invention whether or not the data provided by the soft-decision decoder should be subjected to further decoding steps. In fact said audio decoder could be dispensed with, if, at the DAB transmitter end, the audio data did not undergo source coding prior to the Viterbi encoding.

The received DAB transmission signal, demoted by RF in FIG. 1, is supplied to the front-end 1. Front-end 1 may be similar to a front-end as used in a television receiver. It filters and amplifies the received DAB transmission signal and performs a frequency conversion so as to supply a DAB intermediate frequency signal demoted by IF in FIG. 1 to the quadrature demodulator 2. Quadrature demodulator 2 derives the in-phase and quadrature modulation signals from the DAB intermediate frequency signal. Within the quadrature demodulator 2, these modulation signals are subsequently amplified, subjected to an A/D conversion and multiplexed to obtain a digitized complex modulation signal denoted by CM in FIG. 1. Thus, the real and imaginary components of this digitized complex modulation signal relate to the in-phase and quadrature modulation signals of the DAB transmission signal, respectively.

Frequency multiplex demodulator 6 transforms the digitized complex modulation signal into a digital baseband signal denoted by DB in FIG. 1, by successively performing an FFT operation and a differential phase demodulation. These steps are inverse to the processing steps at the transmitter end, performed on the Viterbi-encoded data, to obtain in-phase and quadrature modulation signals for the DAB transmission signal. Thus, the sample values of the digital baseband signal at the output of the frequency multiplex demodulator 6 relate to the bit values in the Viterbi-encoded data at the transmitter end.

Metric calculator 7, which will be discussed in greater detail in the further description, calculates the most likely value of a Viterbi-encoded data bit from each sample in the digital baseband signal. Furthermore, the metric calculator 7 calculates a number of reliability bits from this sample, indicating the (un)certainty of this most likely bit value. Thus, for each sample, metric calculator 7 provides a combination of a gross bit, representing the most likely bit value, and a number of reliability bits. This combination is referred to as a metric and subsequent metrics are supplied to the soft-decision decoder 4.

The Viterbi decoder 9 receives the metrics via the de-interleaving circuit 8, which changes the sequence of the metrics inverse to the interleaving operation at the DAB transmitter end. For each new metric supplied to its input, the Viterbi decoder 9 determines the most likely output data from a sequence of metrics it has received. In effect, Viterbi decoder 9 calculates the most likely sequence of gross bits from a limited number of possible sequences, determined by the Viterbi-encoder at the transmitter end. In doing so, it uses the reliability bits for establishing the likelihood of a possible gross bit sequence to which the output data is related.

Starting from ideal reception conditions (signal-to-noise ratio at the input of the receiver approximating infinity), with decreasing signal-to-noise ratio the BER in the output data will deteriorate until it becomes unacceptably bad. The signal-to-noise ratio at which the latter condition is reached will further be referred to as threshold value. The more reliability bits each metric comprises and are used by the Viterbi decoder 9 to calculate the most likely output data, the lower (thus better) this threshold value will be. It should be noted that the threshold improvement decreases with each additional reliability bit being added to the metrics. Since the soft-decision decoder 4 becomes more and more complex with an increasing number of reliability bits, a compromise has to be made between threshold value improvement and soft-decision decoder complexity.

In the receiver shown in FIG. 1, three reliability bits for each metric seems a sensible compromise. Consequently, the metrics are four-bit binary words. Then, the A/D conversion accuracy in the quadrature demodulator 2 should preferably be eight bits, the complex modulation signal having 8-bit samples and the frequency multiplex demodulator 6 operating at 8-bit precision. The reason for having an 8-bit sample accuracy in the digital signal path from the quadrature demodulator 2 to the metric calculator 7 is the following.

First of all, the least significant bit(s) in the digital baseband signal samples are mainly a result of computation noise introduced by frequency multiplex demodulator 6. Consequently, the complex modulation signal samples should preferably be represented with at least one or two bits more than the metrics derived from the digital baseband signal.

Secondly, the dynamic range of the A/D converter(s) (not shown) in the quadrature demodulator 2 is preferably not fully used at nominal levels of the DAB intermediate frequency signal at the input of this demodulator. The amplitude of the DAB transmission signal may vary rapidly, for example in non-stationary multipath reception conditions. Due to a control delay in the amplitude stabilization means of the receiver (not shown), a momentary amplitude variation in the DAB intermediate frequency signal may occur under these conditions. Headroom should be reserved to prevent an overdrive of the A/D converter, which would cause non-linear distortion of the digitized complex modulation signal. Such a distortion would affect the metrics and consequently degrade the BER in the data provided by the Viterbi decoder 9. Therefore, the receiver shown in FIG. 1 is set in such a way that there is a sufficient margin between nominal signal levels and the maximum input level of the A/D converter(s). Such a margin is approximately equivalent to two most significant bits in the digitized complex modulation signal. It is noted that the margin may be more or less dependent on the various reception conditions to be accounted for and the properties of the amplitude stabilization means.

The format of the metrics supplied by the metric calculator 7 corresponds to that required by most soft-decision decoders. This format is such that, if the value of all reliability bits corresponds to the value of the gross bit, the gross bit has maximum certainty. On the other hand, if all the reliability bits have a value opposite to that of the gross bit, the gross bit has minimum certainty. Thus, in the receiver shown in FIG. 1, a 4-bit metric with binary value '1111' (decimal value 15 in unsigned binary number representation) indicates that the gross bit value is most certainly '1'. A metric having binary value '0000' (decimal value 0) indicates that the gross bit value is most certainly '0'. Furthermore, the metrics in the receiver shown in FIG. 1 are formatted such that the most significant bit of the metric, being a 4-bit binary word, represents the gross bit. Thus, if a metric is '0111' (decimal value 7) or '1000' (decimal value 8), the gross bit being 0 and 1, respectively, has minimum certainty.

In summary; starting from a first extreme metric value (decimal value 0) towards second extreme metric value (decimal value 15), the reliability of the gross bit having '0' value at decimal value 0 decreases to the point of minimum reliability (decimal value 7) beyond which the gross bit becomes '1' with minimum reliability (decimal value 8), the reliability of this gross bit value increasing until the maximum is reached at decimal value 15.

Figure 2:
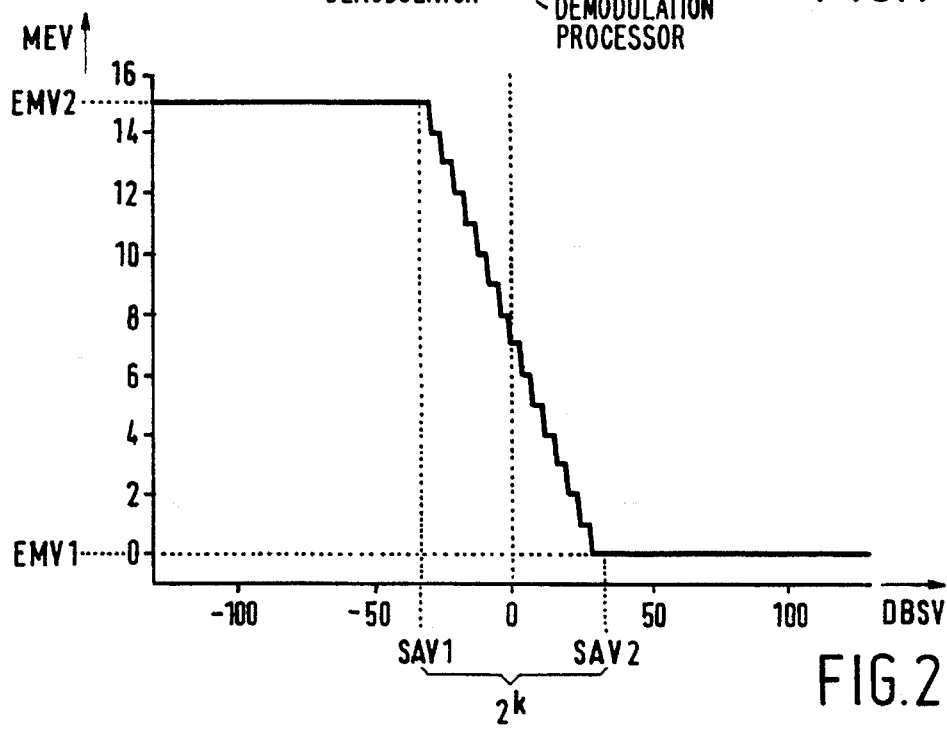
FIG. 2 is an example of a monotonous transition function with equidistant steps for a metric calculator in such a receiver.

FIG. 2 shows a possible transfer characteristic of the metric calculator 7, in the receiver represented by FIG. 1. The horizontal axis relates to the digital baseband signal sample value (DBSV), the vertical axis to the metric value (MEV). In a range bounded by two saturation values, SAV1 and SAV2, the value of a metric varies as a function of the digital baseband sample value, according to a monotonous transition function with equidistant steps between the first extreme metric value (EMV1) and the second extreme metric value (EMV2). The transition function Shown in FIG. 2 can also be expressed by means of the following formula:

$$MEV=-(DBSV-SAV2)>>2$$

where >>denotes a shift over 2 bits.
The number of different digital baseband sample values in said range, including SAV1 and SAV2, is $2^k$. If the digital baseband signal sample value is smaller than SAV1, the metric assumes the second extreme value EMV2 which is '1111' (binary notation). Correspondingly, if said value is larger than SAV2, the metric assumes the second extreme value which is '0000'.

If the received DAB transmission signal is free from noise and distortion, the digital baseband signal samples will assume mainly two values, hereafter referred to as first and second nominal sample values NSV1 and NSV2, respectively. These nominal samples correspond to a first and a second value (say '0' and '1'), respectively, of the bits in the Viterbi-encoded data at the transmitter end. Thus, under idea/reception conditions, there is an unambiguous relation between the digital baseband signal sample values and the transmitted data. Accordingly, the reliability bits should preferably indicate that all gross bits are 'certain'.

However, under practical reception conditions the samples of the digital baseband signal may assume any value within the range of 256 possible values (8-bit representation of the digital baseband samples). The sample values will spread around the NSV1 and NSV2, the amount of spread depending, inter alia, on the carrier-to-noise ratio at the antenna input. Then, the gross bit provided by the metric calculator should relate to the nominal sample value closest to de actual sample value. Accordingly, the reliability bits should preferably indicate the relative difference between the actual sample value and said nominal sample value, when the actual sample value lies between NSV1 and NSV2.

Consequently, the nominal sample values should preferably correspond to the saturation values of the transition function in the metric calculator 7. This can be achieved by appropriately setting the transfer characteristics of the receiver parts between the receiver input and the output of the frequency multiplex demodulator 6. However, this setting will generally not correspond to a setting for optimal signal handling. For example, the latter setting has been calculated for a DAB receiver having an 8-bit two's complement representation of digital baseband samples (decimal value range from −128 to +127). The outcome of this calculation gave rise to values for NSV1 and NSV2 of +43 and −44, respectively.

In contrast, the invention proposes to deviate from the calculated optimal setting for signal handling, in order to simplify the hardware of the metric calculator. In the invention, it is recognized that such a deviation will generally not result in an intolerable degradation of the receiver performance. To give an example, in a DAB receiver having an 8-bit two's complement DAB digital baseband signal, the metric calculator may have saturation values SAV1=+31 and SAV2=−32. Accordingly, the transfer characteristics of said receiver parts are preferably set in such a way that the nominal sample values match with these saturation values. The performance of such a receiver according to the invention, will only be slightly less than a receiver having a metric calculator in which SAV1=+43 and SAV2=−44 and in which said setting is optimized for signal handling.

According to the invention one may also deviate from an optimal receiver design in the sense that the nominal sample values may not match with the saturation values. The saturation values are chosen in such a way that it allows a very hardware-efficient realisation of the metric calculator 7. It is recognized that, with the number of quantizing steps between the saturation values being $2^k$, said setting may involve a compromise between matching the saturation and nominal values on the one hand and optimizing the signal handling properties of the receiver on the other hand. Both elements of this compromise influence the overall receiver performance; a compromise for best performance should be made. This best performance of a receiver according to the invention will generally be insignificantly less than a receiver m which the metric calculator is designed to match with the nominal sample values resulting from an optimal setting in view of signal handling alone.

Figure 3:
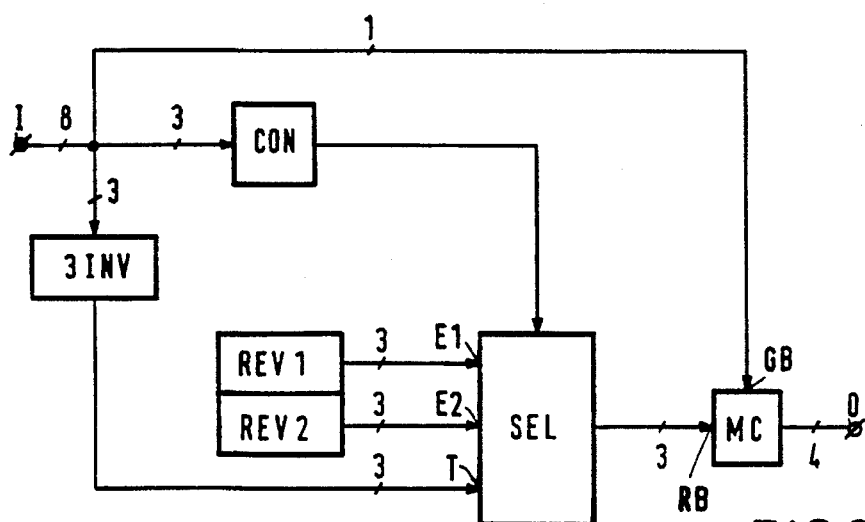
FIG. 3 represents an embodiment of a metric calculator in such a receiver.

A hardware-efficient realisation of a metric calculator in a DAB-receiver according to the invention as shown in FIG. 1, is given by way of example in FIG. 3. The sample values of the digital baseband signal at the input terminal I of the metric calculator are represented in 8-bit two's complement notation. Bit b(7) is the sign bit, the other bits b(6) . . . b(0) representing the magnitude of the sample, so that the decimal value DSV of a sample is:

$$DSV = -1^{b(7)} \sum_{j=0}^{6} b(j) 2^j$$

For each digital baseband signal sample at the input I, the metric calculator provides a suitable 4-bit metric at its output O, in which metric bit m(3) represents the gross bit and metrics m(2), m(1) and m(0) represent the reliability bits. The first and second saturation values are chosen to be +31 and −32, respectively, approximating the nominal sample values (+43, −44) of the DAB receiver at a setting for optimum signal handling.

In the metric calculator of FIG. 3, the gross bit value of a metric is equal to the value of bit b(7) of the distal baseband signal: m(3)=b(7). The sign bit b(7) is taken from the digital baseband signal and applied to the input GB of metric combiner MC. Metric combiner MC supplies the bit received at its input GB as gross bit m(3) of a metric to the output O of the metric calculator; the three bits received at the input RB of the metric combiner are supplied to output O as reliability bits m(2), m(1) and m(0). The source of these reliability bits is determined by selector SEL, having three inputs. At input E1, generator REV1 applies three bit values '0' corresponding to the values of the three reliability bits m(2), m(1) and m(0) at a first extreme metric value. At input E2, generator REV2 applies three bit values '1' corresponding to the values of the three reliability bits at a second extreme metric value. At input T of the selector SEL, the inverted values of three bits, b(4), b(3), b(2), of the digital baseband signal samples are applied. Said bits are inverted by inverter 3INV.

Selector SEL is controlled by the selector controller CON to which the values of bit b(7), b(6) and b(5) are applied. If the values of these bits are equal ('111' or '000'), the bit values at input T are transferred to the metric combiner MC. If not, and b(7)=0, the values '000' provided by REV1 are transferred to metric combiner MC, and conversely, when b(7)=1, the values '111' provided by REV2 are transferred to metric combiner MC. Accordingly, m(2)=b(4), m(1)=b(3), and m(0)=b(2), when the decimal value of the digital baseband signal sample value is at the boundaries or within the range between +31 and −32. If the digital baseband signal sample value is outside this range, m(4), m(3) and m(2) are '0' when it is larger than +31, or alternatively, m(4), m(3) and m(2) are '1' when the sample value is below −32.

Table 1 presented below may be helpful in comprehending the functioning of the metric calculator shown in FIG. 3. Table 1 is an abbreviated list of all possible decimal sample values of the digital baseband signal and the corresponding two's complement 8-bit binary representations thereof.

TABLE 1

| | decimal value digital baseband sample | binary representation digital baseband sample | | | | | | | |
|---|---|---|---|---|---|---|---|---|---|
| | | b(7) | b(6) | b(5) | b(4) | b(3) | b(2) | b(1) | b(0) |
| | +127 | 0 | 1 | 1 | 1 | 1 | 1 | 1 | 1 |
| | +126 | 0 | 1 | 1 | 1 | 1 | 1 | 1 | 0 |
| | . . . | . | . | . | . | . | . | . | . |
| SAV1 → | +032 | 0 | 0 | 1 | 0 | 0 | 0 | 0 | 0 |
| | +031 | 0 | 0 | 0 | 1 | 1 | 1 | 1 | 1 |
| | +030 | 0 | 0 | 0 | 1 | 1 | 1 | 1 | 0 |
| | . . . | . | . | . | . | . | . | . | . |
| | +001 | 0 | 0 | 0 | 0 | 0 | 0 | 0 | 1 |
| | +000 | 0 | 0 | 0 | 0 | 0 | 0 | 0 | 0 |
| | −001 | 1 | 1 | 1 | 1 | 1 | 1 | 1 | 1 |
| | . . . | . | . | . | . | . | . | . | . |
| | −031 | 1 | 1 | 1 | 0 | 0 | 0 | 0 | 1 |
| SAV2 → | −032 | 1 | 1 | 1 | 0 | 0 | 0 | 0 | 0 |
| | −033 | 1 | 1 | 0 | 1 | 1 | 1 | 1 | 1 |
| | . . . | . | . | . | . | . | . | . | . |
| | +127 | 1 | 0 | 0 | 0 | 0 | 0 | 0 | 1 |
| | +128 | 1 | 0 | 0 | 0 | 0 | 0 | 0 | 0 |

It will be evident from this Table that there are many alternatives to the embodiment of a metric calculator as shown in FIG. 3. For example, the metric combiner MC may be dispensed with, the selector SEL directly supplying the 4-bit metric to the output O. In such a variant of the embodiment shown in FIG. 3, the selector SEL receives a first extreme metric value at input E1 and a second extreme metric value at input E2. The input T receives a 4-bit binary word comprising bit b(7) of the digital baseband signal samples next to the inverse of bits b(4), b(3) and b(2).

While one embodiment is shown and described to clarify the invention, those skilled in the art may conceive further alternatives to a metric calculator in a receiver according to the invention, without departing from the spirit and the scope of the invention claimed. It will be clear that the relation between the digital baseband signal sample values and the bit values in the transmission signal may be, inverse to that in the receiver shown in FIG. 1. A positive sign of a two's complement sample value could also have related to a bit value of '1' in the transmission signal instead of '0' and vice versa for a negative sign. It is obvious that such alternatives to the receiver according to invention shown in FIG. 1 imply the addition or omission of inverters.

Further alternatives may result from a binary representation of the sample value of the digital baseband signal, other than two's complement, for example a one's complement, a sign and magnitude or an unsigned representation. This can be illustrated with reference to Table 2, representing possible sample values of a digital baseband signal in unsigned binary representation:

TABLE 2

|  | decimal value digital baseband sample | binary representation digital baseband sample | | | | | | | |
|---|---|---|---|---|---|---|---|---|---|
|  |  | b(7) | b(6) | b(5) | b(4) | b(3) | b(2) | b(1) | b(0) |
|  | 255 | 1 | 1 | 1 | 1 | 1 | 1 | 1 | 1 |
|  | 254 | 1 | 1 | 1 | 1 | 1 | 1 | 1 | 0 |
|  | ... | . | . | . | . | . | . | . | . |
|  | 128 | 1 | 0 | 0 | 0 | 0 | 0 | 0 | 0 |
| SAV2 → | 127 | 0 | 1 | 1 | 1 | 1 | 1 | 1 | 1 |
|  | 126 | 0 | 1 | 1 | 1 | 1 | 1 | 1 | 0 |
|  | ... |  |  |  |  |  |  |  |  |
|  | 097 | 0 | 1 | 1 | 0 | 0 | 0 | 0 | 1 |
|  | 096 | 0 | 1 | 1 | 0 | 0 | 0 | 0 | 0 |
|  | 095 | 0 | 1 | 0 | 1 | 1 | 1 | 1 | 1 |
|  | ... | . | . | . | . | . | . | . | . |
|  | 065 | 0 | 1 | 0 | 0 | 0 | 0 | 0 | 1 |
| SAV1 → | 064 | 0 | 1 | 0 | 0 | 0 | 0 | 0 | 0 |
|  | 063 | 0 | 0 | 1 | 1 | 1 | 1 | 1 | 1 |
|  | ... | . | . | . | . | . | . | . | . |
|  | 001 | 0 | 0 | 0 | 0 | 0 | 0 | 0 | 1 |
|  | 000 | 0 | 0 | 0 | 0 | 0 | 0 | 0 | 0 |

It will be evident that saturation values SAV1=127 and SAV2=64 allow a very hardware efficient realisation of a metric calculator. If b(6)=0 and b(7)=0, a selector may pass a first extreme 4-bit metric value '0000' to an output of the metric calculator and if bit b(7)=1, a second extreme metric value '1111' is passed to the output. In the range between the two saturation values, the selector supplies b(5) as the gross bit to the output and bits b(4), b(3) and b(2) as the reliability bits. A drawback of said saturation values is that the transition function is not symmetrical with respect to the extreme sample values of the digital baseband signal. However, when saturation values SAV1=96 and SAV2=159 are chosen, the transition function is centred in the digital baseband sample value range. Given the preceding examples, a skilled Worker can readily conceive the hardware of a metric calculator having said saturation values.

It should be noted that the invention does not rely on a specific metric format. The invention may be used in receivers having a soft-decision decoder with a metric format different from that in the preceding examples. For example, the format could be such that maximum certainty is indicated when all the reliability bits have a value opposite to that of the gross bit, or such a value that the reliability-indication is independent from the value of the gross bit. It is clear that differences in metric format imply minor and obvious modifications to the hardware of the metric calculators.

Structural differences of a metric calculator formed as an integrated circuit in a semiconductor body may originate from the type of silicon compiler used to generate the integrated circuit mask set. Most designs of a receiver according to the invention will involve a specification of the relationship between the digital baseband signal sample values and the metrics corresponding thereto. This specification is then used as input data for a silicon compiler, which generates the mask set for an integrated circuit performing the metric calculation according to this specification.

It will be evident that the number of bits used to represent a digital baseband signal sample value may differ from 8 and that the number of reliability bits in a metric may differ from 3, as in the receiver shown in FIG. 1. To simplify the hardware of said receiver, the digitized complex modulation signal and the digital baseband signal derived therefrom may be represented in 6-bit precision instead of 8-bit precision. Accordingly, the number of reliability bits in the metrics is reduced to 1 or 2, and the number of quantization steps between the range bounded by the saturation values of the metric calculator may be changed from 64 to 32 or 16. Such a modification of the receiver as previously discussed not only simplifies the hardware of the quadrature demodulator 2 and the frequency multiplex demodulator 6, but also reduces the amount of memory required in the de-interleaver 8 and the complexity of the soft decision Viterbi decoder 9. Of course, such a hardware-efficient receiver will exhibit a poorer threshold value as previously discussed.

The invention has been explained in detail with reference to a receiver structure as proposed for DAB. It will be evident that the invention may advantageously be used in receivers other than for DAB, for example in receivers for DVB (Digital Video Broadcasting). In such receivers the input part (the signal processing parts between the receiver input and the metric calculator input) may differ from that of the receiver as shown in FIG. 1. The transmission signal to be received may have a type of modulation other than OFDM as used in DAB, for example single carrier modulation. It can also be envisaged that data is transmitted in baseband, via a cable for example, such that the input part does not comprise a demodulator. The receiver according to the invention may also be an optical receiver having an opto-electrical converter in the input part.

The use of soft-decision decoders other than Viterbi is by no means excluded in a receiver according to the invention. Such a receiver may also have a type of soft-decision decoder which uses redundancy introduced by the transmission channel (e.g. inter-symbol interference due to echoes) to correct faulty bits. In some cases, the term soft-decision detector is used for such a decoder. It will be clear that these terms relate to one and the same functional part in a receiver, namely a device having error correcting capabilities based on redundancy in the transmission signal.

Briefly stated, a hardware-efficient data receiver has been proposed. In the receiver, digital baseband signal samples relate to the bits in the transmission signal. For each sample a metric calculator calculates an input data element (metric) for the soft-decision decoder in the receiver. The metric is a binary word of whose most significant bit (gross bit) indicates the most likely value ('0' or '1') of a bit in the transmission signal. The other bits of the metric (reliability bits) express the reliability of this gross bit.

The metric calculator exhibits a monotonous transition function with equidistant steps between to extreme metric values (all metric bits are '0' or '1'). According to this transition function, the metric value varies as a function of the digital baseband signal sample value, in a range bounded by two saturation values. The number of different sample values in this range, including the saturation values, is two to the power of an integer. Within this range, the reliability bits may readily be derived from a selected number of bits in the binary representation of a digital baseband sample.

I claim:

1. A data receiver, comprising:

an input part for converting a transmission signal into a digital baseband signal having samples relating to a distinct bit in said transmission signal;

a metric calculator for calculating, from each of the digital baseband signal samples, a metric comprising a gross bit representing the value of said distinct bit and at least one reliability bit for indicating the reliability of said gross bit; and a soft-decision decoder for deriving data from metrics supplied thereto, said metric calculator comprising means for setting a metric to (a) a first extreme value, in response to a said digital baseband signal sample whose value is smaller than a first saturation value;

(b) a second extreme value, in response to a said digital baseband signal sample whose value is larger than a second saturation value, and (c) a value according to a monotonous transition function with equidistant steps between the extreme values, in response to a said digital baseband signal whose value is in a range bounded by the first and the second saturation value, said range comprising a number of $2^k$ different digital baseband signal sample values including the boundary saturation values, k being an integer larger than the number of reliability bits (r) but smaller than or equal to the number of bits (n) in the binary representation of the digital baseband signal.

2. A receiver as claimed in claim 1, characterized in that the input part comprises means for matching a first and a second nominal sample value of the digital baseband signal, relating to a first and a second value of the bits in the transmission signal, respectively, with said first and second saturation values of the metric calculator, respectively.

3. A receiver as claimed in claim 2, characterized in that a said sample of the digital baseband signal has a binary value represented in two's complement, the first saturation value equals $-2^{k-1}$ the second saturation value equals $+2^{k-1}-1$.

4. A receiver as claimed in claim 3, characterized in that k is larger than r+1.

5. A receiver as claimed in claim 3, characterized in that k is smaller than n.

6. A method of deriving metrics from a digital baseband signal in a data receiver, said digital baseband signal comprising samples relating to a distinct bit in a transmission signal, said metrics comprising a gross bit representing the value of said distinct bit and at least one reliability bit for indicating the reliability of said gross bit, said method comprising:

setting a metric to a) a first extreme value, in response to a said digital baseband signal sample whose value is smaller than a first saturation value;

b) a second extreme value, in response to a said digital baseband signal sample whose value is larger than a second saturation value, and c) a value according to a monotonous transition function with equidistant steps between the extreme values, in response to a said digital baseband signal whose value is in a range bounded by the first and the second saturation value, said range comprising a number of $2^k$ different digital baseband signal sample values including the boundary saturation values, k being an integer larger than the number of reliability bits (r) but smaller than or equal to the number of bits (n) in the binary representation of the digital baseband signal.

7. A signal-processing device for deriving metrics from a digital baseband signal in a data receiver, said digital baseband signal comprising samples relating to a distinct bit in a transmission signal, said metrics comprising a gross bit representing the value of said distinct bit and at least one reliability bit for indicating the reliability of said gross bit, said signal-processing device comprising:

an integrated circuit in a semiconductor body, said integrated circuit comprising means for setting a metric to a) a first extreme value, in response to a said digital baseband signal sample whose value is smaller than a first saturation value;

b) a second extreme value, in response to a said digital baseband signal sample whose value is larger than a second saturation value; and c) a value according to a monotonous transition function with equidistant steps between the extreme values, in response to a said digital baseband signal whose value is in a range bounded by the first and the second saturation values, said range comprising a number of $2^k$ different digital baseband signal sample values including the boundary saturation values, k being an integer larger than the number of reliability bits (r) but smaller than or equal to the number of bits (n) in the binary representation of the digital baseband signal.

8. A receiver as claimed in claim 1, characterized in that a said sample of the digital baseband signal has a binary value represented in two's complement, the first saturation value equals $-2^{k-1}$ the second saturation value equals $+2^{k-1}-1$.

9. A receiver as claimed in claim 1, characterized in that k is larger than r+1.

10. A receiver as claimed in claim 1, characterized in that k is smaller than n.

* * * * *